United States Patent [19]
Di Perna

[11] 4,203,842
[45] May 20, 1980

[54] SYSTEM FOR OIL AND WATER SEPARATION

[76] Inventor: James Di Perna, 85 Foxhill Ter., Staten Island, N.Y. 10305

[21] Appl. No.: 966,798

[22] Filed: Dec. 6, 1978

[51] Int. Cl.² ............................................. E02B 15/04
[52] U.S. Cl. ........................... 210/242 S; 210/DIG. 25
[58] Field of Search ................. 210/83, 242, DIG. 25, 210/115

[56] References Cited

U.S. PATENT DOCUMENTS

| | | | |
|---|---|---|---|
| 1,948,543 | 2/1934 | Samiran | 210/115 |
| 3,651,943 | 3/1972 | Di Perna | 210/DIG. 25 |
| 3,690,464 | 9/1972 | Heinicke | 210/DIG. 25 |
| 3,852,193 | 12/1974 | Jakabek | 210/DIG. 25 |
| 3,909,416 | 9/1975 | Veld | 210/242 |

FOREIGN PATENT DOCUMENTS 96580 1/1961 Netherlands ............................ 210/115

Primary Examiner—Theodore A. Granger
Attorney, Agent, or Firm—Richard L. Miller

[57] ABSTRACT

A system for oil and water separation by siphon and vacuum means, upon an oil tanker vessel; the system including in one design a relatively small, sealed tank upon a deck of the vessel, a hand controlled vent valve on a top of the tank, an outlet end of a siphon line entering the tank while an inlet end of the siphon line may run into a collection or other tank, and discharge lines from lower and upper ends of the sealed tank being connected to pumps for discharging oil at a top and water at the bottom.

1 Claim, 4 Drawing Figures

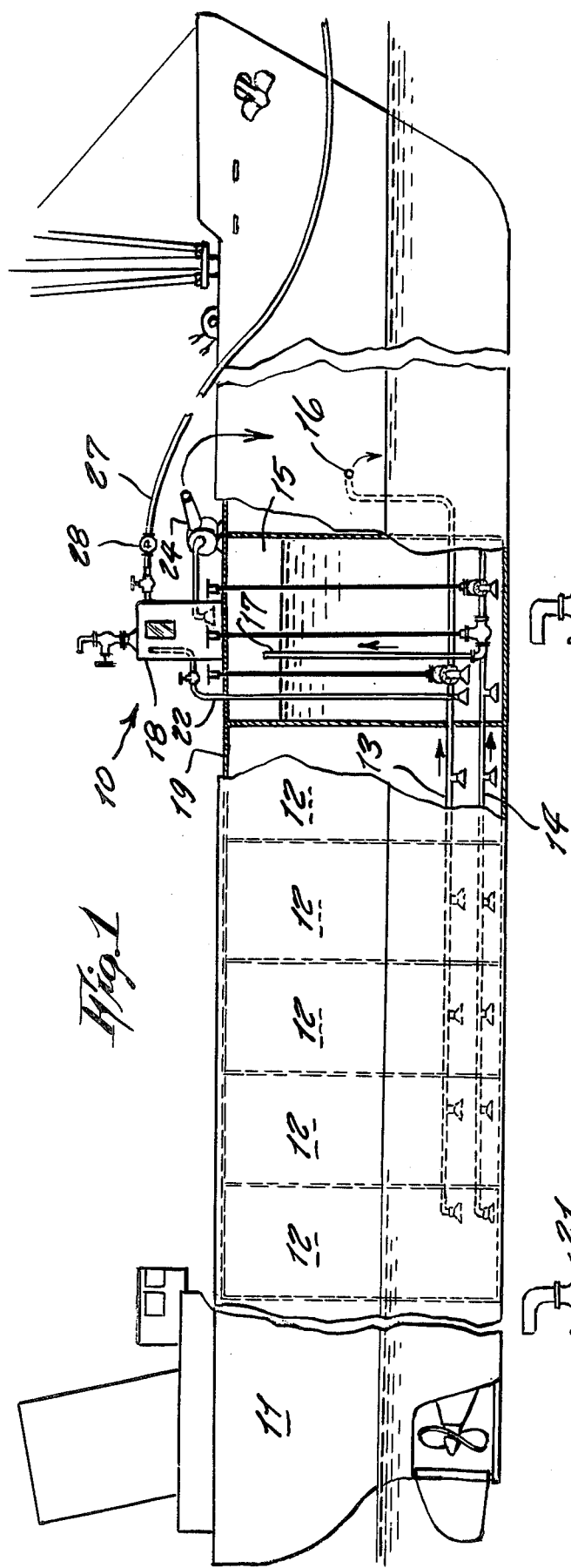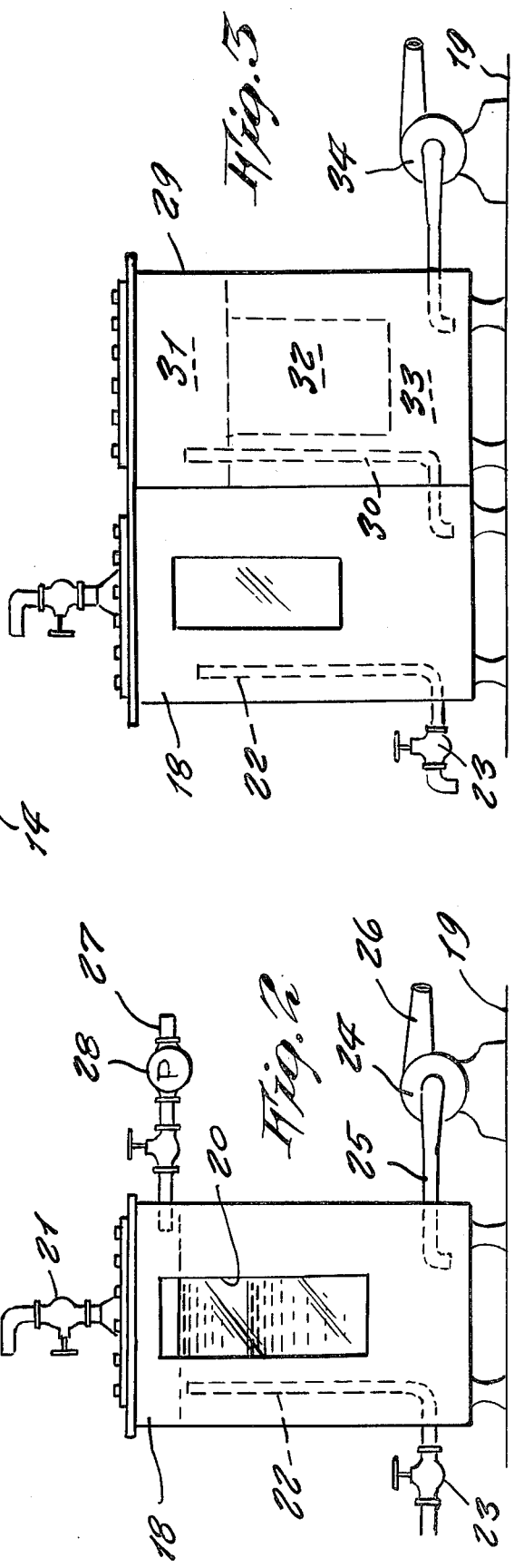

SYSTEM FOR OIL AND WATER SEPARATION

BACKGROUND OF THE INVENTION

This invention relates generally to apparatus for separation of oil and water upon a tanker ship, and is an improvement over applicant's U.S. Pat. No. 3,957,009 on a Ship Ballast Oil Water Separation System.

Heretofore methods have been employed by pumping a mixture of water and oil into collecting tanks from which after settling and separating, the oil is pumped into storage tanks while the water is dumped back into the sea. However, it is found that moving the mixture through a pump homogenizes the mixture so that separation becomes more difficult to achieve.

SUMMARY OF THE INVENTION

Accordingly a principal object of the present invention is to provide an improved system for oil and water separation when these fluids are intended to be removed from a ship, so that only the water can be dumped back into the sea while the oil is collected in tanks so to not pollute the sea water.

Another object is to provide a system for oil and water separation that utilizes a siphon and vacuum means for moving the oil and water mixture instead of employing a pump for the same.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the the scope of the appended claims.

BRIEF DESCRIPTION OF THE DRAWINGS

FIG. 1 is a side view of a ship, partly in cross section and showing one design of the separation system.

FIG. 2 is an enlarged detail of part of the system above deck.

FIG. 3 is an enlarged detail of a modified design thereof.

Figure 4:
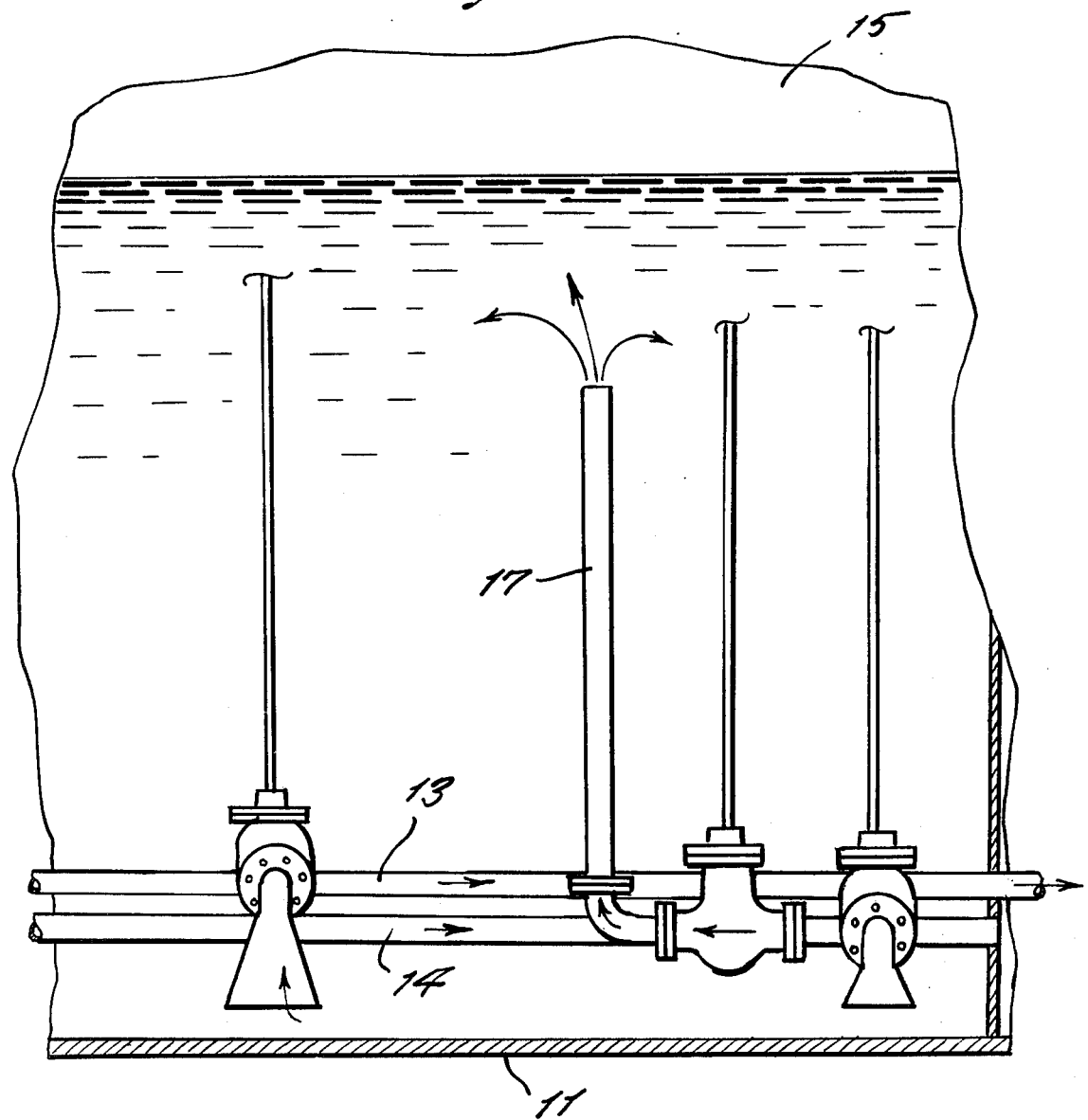
FIG. 4 is an enlarged detail of part of the system shown in FIG. 1.

Referring now to the drawings in greater detail, the reference numeral 10 represents a system for oil and water separation on an oil carrying ship 11, according to the present invention.

The ship comprises a tanker vessel having a plurality of oil carrying holds of tanks 12 which are interconnected by cargo line 13 and a strip line 14. At one end of the tanks 12, there is a collecting tank 15 into which the strip line extends and through which the cargo line extends and at its end has on outlet 16 for dumping into the sea. The strip line also communicates with a discharge pipe 17 that discharges into the tank 15.

In the present invention, an airtight, completely sealed tank 18 is mounted upon the deck 19 of the ship. The size of the tank depends on the job to be done and which may comprise either cleaning up (a) a ballast, (b) drainage Or (c) bilge of both small and large boats.

A window 20 is provided in a side of the tank 18 so to readily see an oil-water separation. A safety relief vacuum valve 21 is installed on top of the tank 18. One end of a siphon overflow line 22 extends into the tank, and the opposite end thereof extends down inside the collection tank 15 or elsewhere. A valve 23 intercepts the line 22 so to allow control of the siphon inlet.

A pump 24, mounted also on the deck 19, includes a suction line 25 extending therefrom and into the tank 18. A discharge pipe 26 from the pump is directed to discharge into the sea.

A pipe 27 from an upper end of tank 18 is intercepted by an oil pump 28 so to carry oil from the tank to a storage tank that may be located either on another vessel or upon the shore.

The descriptive operation of the system is a follows: Fill up to the percent of the tanks as are needed for the ballast, including the collecting tank. Let it remain that way all during the trip, so that all the oil will rise up. When it is time to discharge the ballast water, first pump the water from the bottom of the tanks 12 out into the sea, as usually done but do not discharge the water from the collecting tank 15. This must stay filled.

When the oil and water level reaches the time to strip, stop pumping the water out into the sea from the ballast tanks 12 and start siphoning the oil and water from the ballast tanks 12 into the collecting tank 15 by pumping with a cargo line 13 the clean water out into the sea from the collecting tank 15.

The collecting tank 15 must be air tight. When water is discharged out a vacuum will be created and will siphon with the strip line 14 the oil and water that remains in the ballast tanks. When all the oil and water is collected in top of the collecting tank, close the overflow valve of strip line and open the vent of the collection tank and pump all the clean water from the bottom out to sea.

When the level descends to a point where it is a danger to pump oil, stop pumping and try to strip as much water as you can. To take the remaining water out completely, use the siphon system by vacuum from top of deck.

The operating details of the system, in summary include:

First: Opening the vent valve 21 so to fill the tank.

Next: Bring the siphon line 22 to a working site which may comprise either the collection tank (as shown) or else a bilge, drainage or ballast tank or an oil spill.

Then Finally: Start the pump 24 so to take water from the tank 18 in order to create a powerful vacuum. The discharging water will cause siphoning action through line 22 up to the tank 18. If the siphoning is continuous for a large quantity of oil and water, then the other pump 28 will be required to pump out the floating oil.

In FIG. 3, a modified design of the invention includes a second dealed tank 29 adjacent the sealed tank 18 and into which the water and sludge from tank 18 will flow by means of pipe 30 therebetween so to enter an upper chamber 31 separated by a filter 32 from a lower chamber 33. Thus further refined separation is made possible so that only water, without sludge, can be returned back to the sea through a pump 34.

While certain novel features of this invention have been shown and described and are pointed out in the annexed claims, it will be understood that various omissions, substitutes and changes in the forms and details to the device illustrated and its operation can be made by those skilled in the art without departing from the spirit of the invention.

What is claimed is:

1. A system for oil and water separation upon a tanker ship, comprising in combination, a sealed first tank upon a ship deck, a hand-controlled vent valve upon a top of said first tank and an observation window on a side of said first tank, a siphon line having an outlet inside said tank, an opposite end of said syphon line freely depending downward into a below-deck collection tank of said ship for containing a mixture of oil and water, said syphon line being intercepted by a hand-controlled valve, an upper outlet from said first tank comprising a suction line connected to a pump for discharging oil from said tank, a lower outlet from said tank comprising a suction line connected to a second pump for discharging water from said first tank, and a second tank adjacent a side of said first tank, a pipe between a lower end of said first tank and an upper end of said second tank, a filter between an upper and lower portions of said second tank, for separation of sludge therebelow and water above, and a line from said second tank connected to a pump for draining of said water therefrom in a sludge-free condition back into the sea.

* * * * *